May 20, 1941.  K. E. LÖFVENMARK  2,242,709
FURNACE FOR SOLID FUEL
Filed March 23, 1939   8 Sheets-Sheet 1

Karl E. Löfvenmark

May 20, 1941.  K. E. LÖFVENMARK  2,242,709
FURNACE FOR SOLID FUEL
Filed March 23, 1939  8 Sheets-Sheet 7

Fig. 8

Karl E. Löfvenmark
by Cushman, Darby & Cushman

Fig. 9

Patented May 20, 1941

2,242,709

UNITED STATES PATENT OFFICE 2,242,709

FURNACE FOR SOLID FUEL

Karl Einar Löfvenmark, Traneberg, Sweden, assignor to Bolinder's Fabriks Aktiebolag, Stockholm, Sweden, a corporation of Sweden Application March 23, 1939, Serial No. 263,780
In Sweden March 23, 1938

14 Claims. (Cl. 126—1)

The present invention relates to furnaces for solid fuel, especially wood fired stoves but also including other heating apparatus such as central heating boilers and the like.

In furnaces of this type hitherto known it has already been proposed to provide means for controlling the combustion so as to permit a low combustion to be maintained during a relatively long period of time. This control was as a rule effected by throttling the air supply, whereas the zone in which the combustion takes place was maintained unchanged as to size and/or position. If in such a furnace only a low combustion is to be maintained, that is to say a combustion barely sufficient to keep the fire burning without taking out any heat from the furnace, the air must not be throttled too much, as otherwise the fire goes out. By this relatively large air supply on low combustion as well as on account of the fact that such low combustion takes place in a zone equally large as that used in forced combustion the fuel consumption becomes relatively large whereby the time is short during which the fire can be maintained with a given charge of fuel stored in the furnace or stove.

One object of the invention is to provide a furnace of the class described in which the speed of the combustion may be controlled within relatively wide limits and in which a low combustion may be reliably maintained during a long period of time at a relatively low fuel consumption.

Another object of the invention is to provide a furnace of the class described in which the size and/or position of the zone of combustion may be varied to suit combustion conditions of different degrees of intensity.

A further object of the invention is to provide a furnace of the class described in which an adjustable damper is provided close by the combustion chamber, preferably in or replacing a side wall of said chamber, said damper being so arranged as to permit on adjustment variation of the zone of combustion as to size and/or position.

Further objects of the invention will be apparent according as the following description proceeds reference being made to the accompanying drawings in which a preferred embodiment of a wood fired cooking stove according to the invention is shown by way of example.

In the drawings, 2 designates the furnace proper which at its top continues in a fuel container in the form of a vertical or somewhat inclined shaft 4. This shaft which is approximately square in cross section has at least in a wood fired furnace a width of 15 to 25 centimetres so as to permit standard so called three-sawn wood to be placed therein only in standing position. The bottom of the combustion chamber is formed by a grate 6 on which the logs bear with their end. On three sides the combustion chamber is covered by a fire-proof lining 8, whereas the fourth side is formed by a damper 10 in the form of a plate of steel or any other suitable material. This damper is displaceable in substantially vertical guides and is operable from the outside of the stove by means of a handle 12 which by a rod 14 is connected to a lever 18 fulcrumed at 16 and carrying a claw 20 engaging the side of the damper plate 10. The damper plate 10 has a slot 22 which in this case extends substantially along the whole width of the combustion chamber at the rear edge of the grate. Consequently, the size of the outlet opening is determined by the upper edge of the slot in cooperation with said rear edge of the grate, as shown in Figs. 3a and 3b in which line $x$ designates the rear edge of the grate. If desired, a rigid plate may be provided between the plate 10 and the grate, and in such case the upper edge of said plate will form the lower limitation of the outlet opening. The upper edge of the slot 22 extends along a broken or bent line having its lowest point substantially at the middle so that at a small total outlet area said outlet is formed by two openings each lying at a side of the damper plate (see Fig. 3a), said openings increasing according as the total outlet area increases by displacing the damper plate 10 upwards. At greater total outlet area the outlet is formed by an opening extending along the whole width of the combustion chamber (see Fig. 3b). When the damper plate 10 is moved further upwards the whole slot 22 will become uncovered, and by continued upward movement of the plate no variation of the outlet as to size will, of course, be obtained but only as to level in the combustion chamber. By this shape of the outlet opening the combustion will be maintained at the sides of the combustion chamber even when the combustion is low. If the slot in the damper plate were of uniform width, there would be a risk of the combustion taking place only at the middle portion causing a hollow to be formed at this place, whereas along the sides the logs would be unburnt and form a bridge preventing the logs at the middle from moving downwards and causing the combustion to cease.

Figure 4:
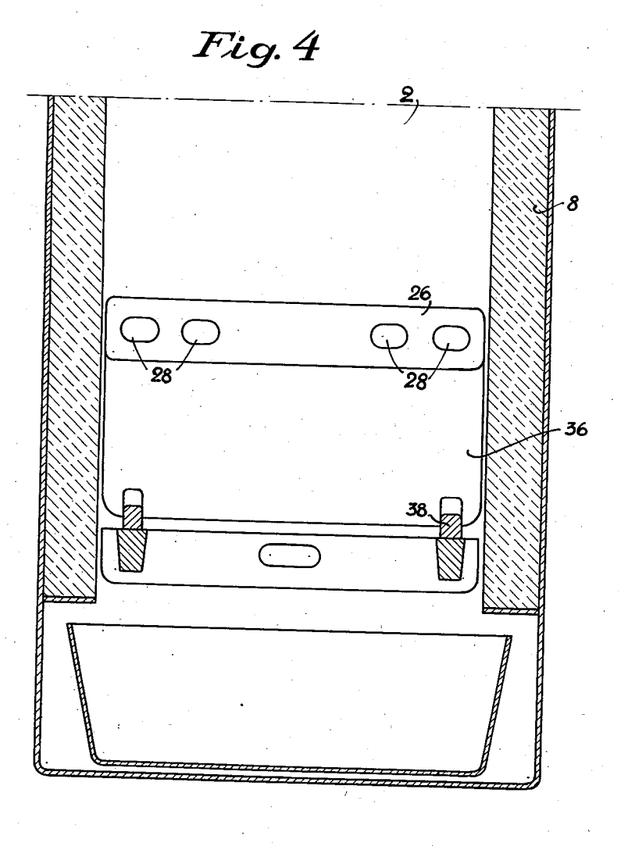
Fig. 4 is a cross-sectional view of the lower portion of the stove on an enlarged scale as seen from the inside thereof towards the ash lid.
Figure 5:
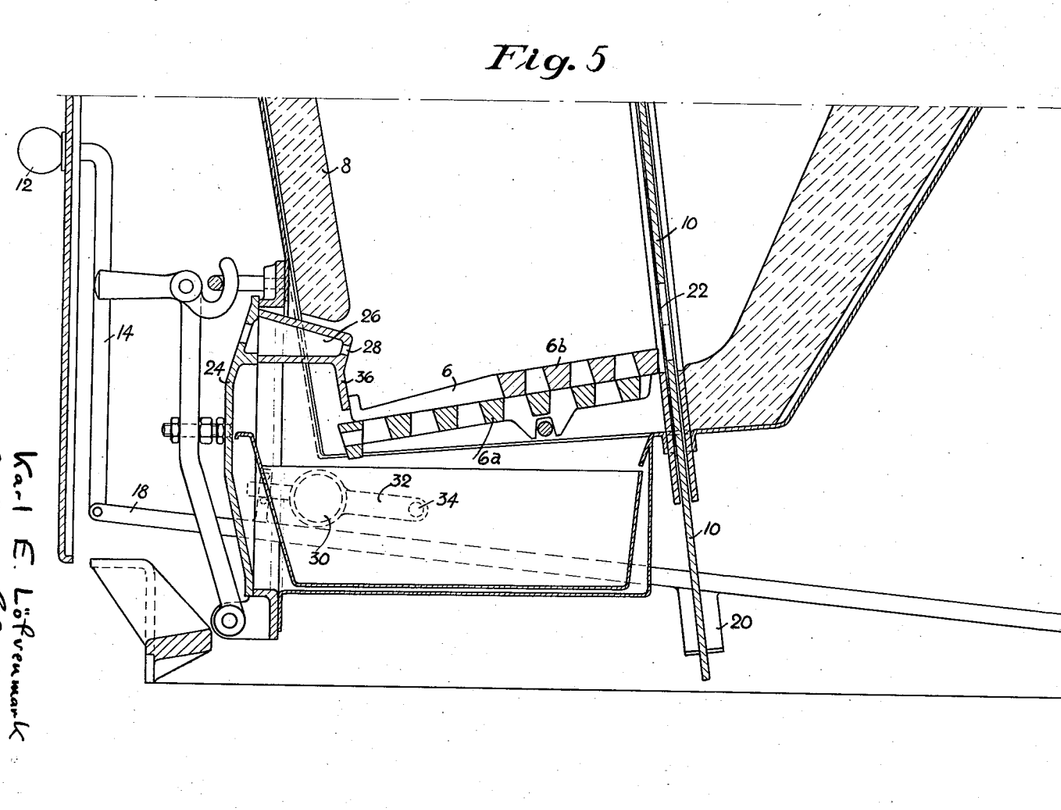
Fig. 5 illustrates parts of the section according to Fig. 2 on an enlarged scale.

The air is supplied to the combustion chamber along two paths, on the one hand through the grate 6 and on the other hand through openings in the ash door 24. The latter way is intended for air serving to maintain minimum of combustion, whereas the air through the grate serves to effect a lower or higher degree of forced combustion. Provided in the ash door 24 is a nozzle 26 of cone shaped longitudinal section, said nozzle extending into the combustion chamber and opening into a plurality of openings 28 arranged in a row. By this arrangement the air of combustion is guided inwards towards the part of the combustion chamber lying directly above the grate whereby a horizontally directed combustion is effected causing the logs to be burnt from their lower end and to move successively downwards towards the grate according as they are burnt off. Most of the openings 28 are situated at the sides of the ash door (see especially Fig. 4) which arrangement has the same purpose as the shape of the slot in the damper plate 10, viz. on low combustion to guide the air of combustion towards the sides of the combustion chamber. The air intake in the ash door 24 is rigid and so dimensioned as to allow supply of a quantity of air barely sufficient to maintain the combustion. On the contrary the intake for the supply of the air required for stronger combustion is adjustable and opens into the combustion chamber separated from the rigid air supply intake 26, 28. To this end the ash space below the grate has in its wall an opening 30 (see Fig. 5), through which the air enters and then passes through the grate. The opening 30 is covered more or less by a screen plate 32 pivoted at its one end as at 34 and at its other end connected to the lever 18. Thus, this plate 32 and the damper plate 10 are adapted to be adjusted jointly by means of the handle 12 and are operatively set in relation to each other so that a given size of the uncovered part of the opening 30 for air of combustion corresponds to a given size of the outlet opening 22 from the combustion chamber.

The grate is formed by two parts, viz. a lower grate 6a comprising in known manner spaced grate bars, and an upper grate 6b formed in similar manner but having grate bars only at the rear portion of the combustion chamber. The bars of the upper grate are normally situated right before the interspaces in the lower grate so that on the portion of its surface nearest to the outlet opening the combined grate is impermeable or at least difficultly permeable to air. This arrangement of the grate is of importance in connection with the horizontal combustion, as the air from the ash space is thereby prevented from passing the shortest way through the rear part of the grate and directly to the outlet opening. The upper grate 6b bears loosely on the lower one, and after the door 24 has been opened it may be moved to and fro causing the ashes to fall down through the interspaces of the grate also in the rear portion thereof according as the interspaces in the upper and lower grates are brought to register. In order to ensure a correct position of the upper grate when the ash door 24 is closed said door is provided with a lug 36 (see Figs. 4 and 5) abutting against a corresponding abutment 38 on the grate 6b. If desired, the grate may be impermeable or difficultly permeable to air over its whole surface, all air being in this case supplied above the grate.

Figure 2:
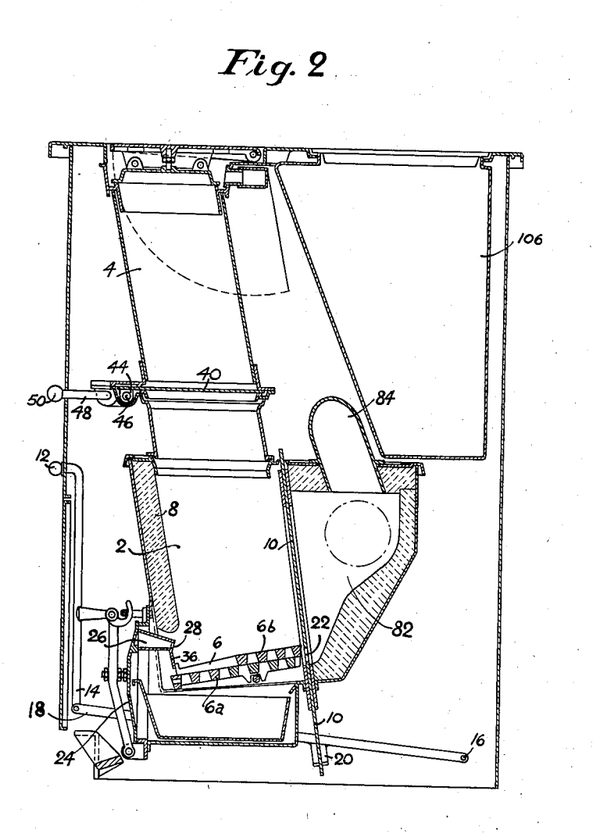
Fig. 2 is a lateral cross-sectional view of the stove along the line II—II in Fig. 1.
Figure 3:
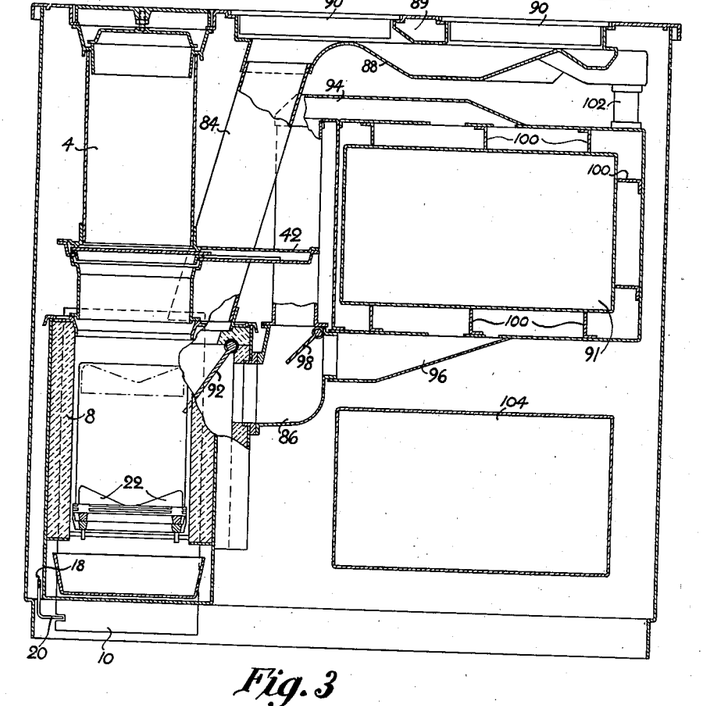
Fig. 3 is a front cross-sectional view of the stove along the line III—III in Fig. 1.
Figure 3A:
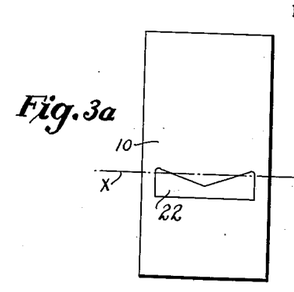
Figs. 3a and 3b are elevations of a damper plate in two positions of setting in relation to the rear edge of the grate.
Figure 3B:
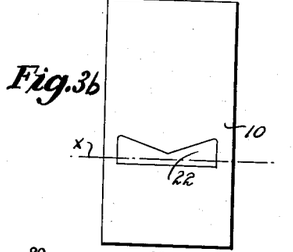

Provided within the fuel container 4 is a horizontally displaceable plate 40 (see Fig. 2) which normally is stowed away within a separate housing 42 built out gas-tightly on the fuel container (see Fig. 3). The plate 40 has two lugs 44 by means of which it is guided on a rod 46. Secured to the plate is an angularly bent arm 48 passing through an opening in the housing 42 and carrying at its outer end a handle 50 by means of which the plate 40 may be displaced laterally. When the plate is in position within the fuel container, the upper portion of the latter is shut off from the combustion chamber so as to form a separate feeding chamber which may be filled with logs without combustion gases escaping from the fuel container into the surrounding room. When this feeding chamber is filled, the plate is returned into its stowed away position by means of the handle 50.

Figure 6:
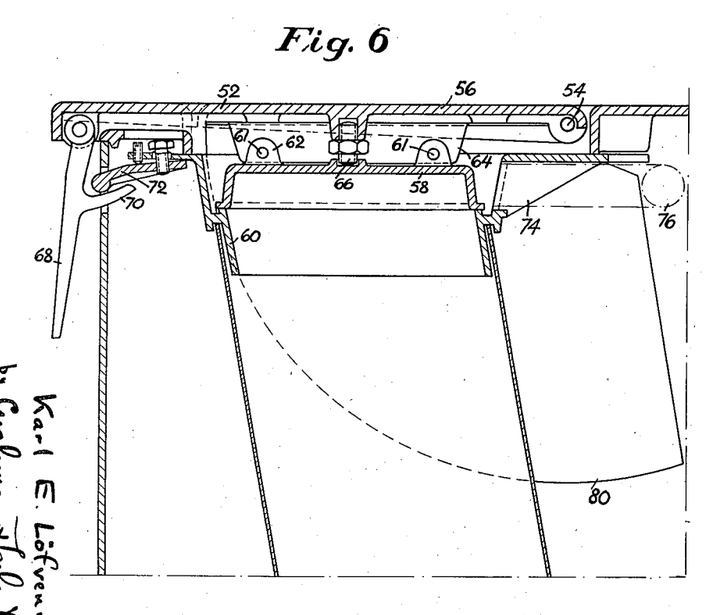
Figs. 6 and 7 are vertical cross-sectional views taken perpendicularly to each other of a filling closure.
Figure 7:
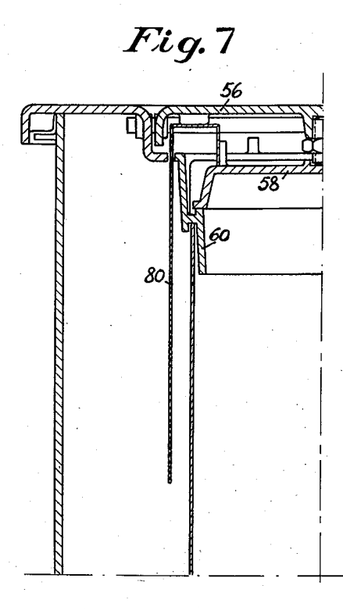

At its top the fuel container is closed by a filling closure 52 (see Figs. 6 and 7) turnably mounted on a horizontal shaft 54. This closure consists of an outer cover plate 56 in flush with the upper surface of the top plate or hearth of the stove and an inner cover plate 58 bearing tightly on a strengthening flange 60 provided around the upper end of the fuel shaft. The inner cover 58 is suspended on the outer one 56 by means of bolts 61 which connect lugs 62 on the inner cover with flanges 64 projecting downwardly from the outer cover. Provided between the outer and inner covers is a centrally disposed adjustable bolt 66 serving to transfer the tightening pressure onto the inner cover. The bolts 61 engage loosely the corresponding openings so as to serve only to maintain the cover approximately in correct position but not to press the closure onto the flange 60. Secured to the outer cover 56 is a handle 68 for the manipulation of the closure and for producing the tightening pressure. For this latter purpose the handle 68 is provided with a projecting arm 70 the upper edge of which co-operates with a member 72 adjustably mounted on the flange 60, the arrangement being such that on pressing the handle inwardly the closure is forced into tight engagement with the flange 60.

Figure 1:
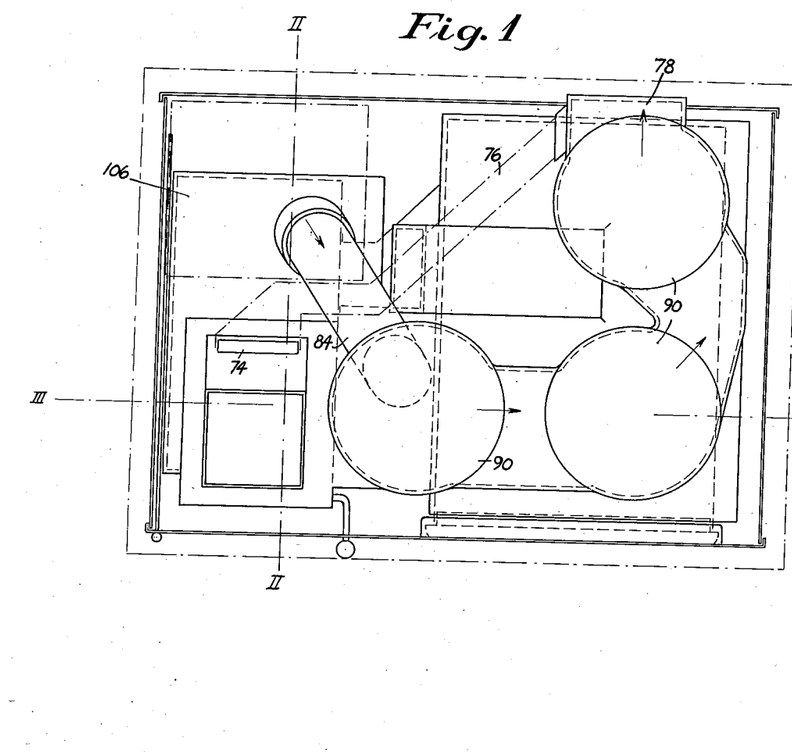
Fig. 1 is a plan view of the cooking stove with the top plate or hearth removed.

Provided within the space between the outer and inner covers 56, 58 is a suction opening 74 which by a conduit 76 (see also Fig. 1) communicates with a flue 78 leading to a chimney. Thus, within the space between the two covers a partial vacuum prevails on account of the draught causing air to be sucked in from the outside and carrying with it such combustion gases which may leak out between the cover 58 and the flange 60. When the fuel container 4 is to be filled and the shutting plate 40 is moved into position within the fuel shaft, the handle 68 is turned outwardly and the closure is somewhat lifted causing the separated feeding chamber to be connected with the suction opening 74 and the combustion gases within said chamber to be sucked out. Thereafter the closure may be wholly raised and the fuel shaft filled without any smoke entering the room. Secured to the cover 56 are two screens 80 in the form of a quarter of a circular surface and extending along the sides of the fuel shaft when the closure is closed. When the closure is open, these screens form lateral walls of the filling opening and serve to prevent the formation of whirls near the suction opening 74 on account of entering air thereby preventing any combustion gases not yet sucked out from being whirled into the room.

Provided behind the combustion chamber 2 is a flame space 82 (see Fig. 2) the walls of which are likewise covered by a lining of fireproof material. From this space the combustion gases escape along two paths, viz. through pipe 84 or through pipe 86 (see Fig. 3). Pipe 84 conducts the combustion gases obliquely upwards into the member 88 in which they pass successively along the underside of the flanged cooking plates 90 and thereafter escape through the outlet opening 78, as shown by the arrows in Fig. 1. The heat is prevented from being dissipated to any considerable degree by the cooking plates 90 and the member 88 being insulated by means of insulating material arranged amongst other at 89 in Fig. 3. The other pipe 86 leads to a frying or baking oven 91. Provided in front of the mouth of this pipe 86 within the flame space 82 is a damper 92 adjustable from the front side of the stove and adapted to distribute the combustion gases to the cooking plates and the baking oven or, if desired, wholly to shut off either of the paths according to the amount of heat required at said places. Pipe 86 is divided into two branches 94 and 96 leading to the upper and lower side of the oven 91, respectively, and provided at the point of branching is a damper 98 which is adjustable from the outside and serves to control the ratio between upper heat and lower heat to the oven or wholly to shut off either of the branches. When it is desired to use the oven as a browning oven, the damper 98 is turned downwardly so as wholly to shut off the branch conduit 96 causing the whole quantity of combustion gases to pass to the upper side of the oven. The oven 91 has a double casing, and the combustion gases pass through the interspace between the casing walls. Flanged plates 100 extend in the longitudinal direction of the oven and are provided with holes for the passage of the gases, said holes being so positioned as to cause the gases from the conduits 94 and 96 to be evenly distributed along the whole length of the oven. 102 designates a pipe connection which connects the casing of the baking oven with the member 88 and through which the gases escape from the oven.

Provided below the oven 91 is another oven 104 heated by the radiation within the stove. In this oven dishes may be placed which are to be kept warm. Behind the filling closure 52 is further a warm water container 106 communicating with a cock provided on the front of the stove (not shown).

Figure 8:
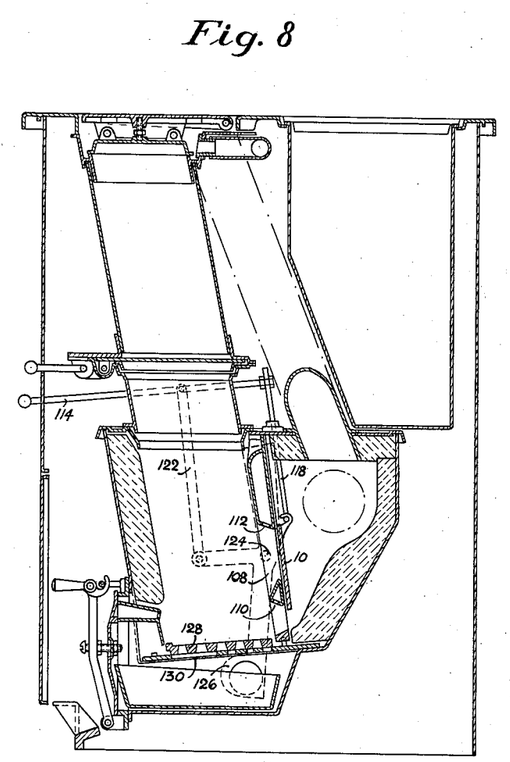
Figs. 8 and 9 are cross-sectional views corresponding to Figs. 2 and 3, respectively of a modification.
Figure 9:
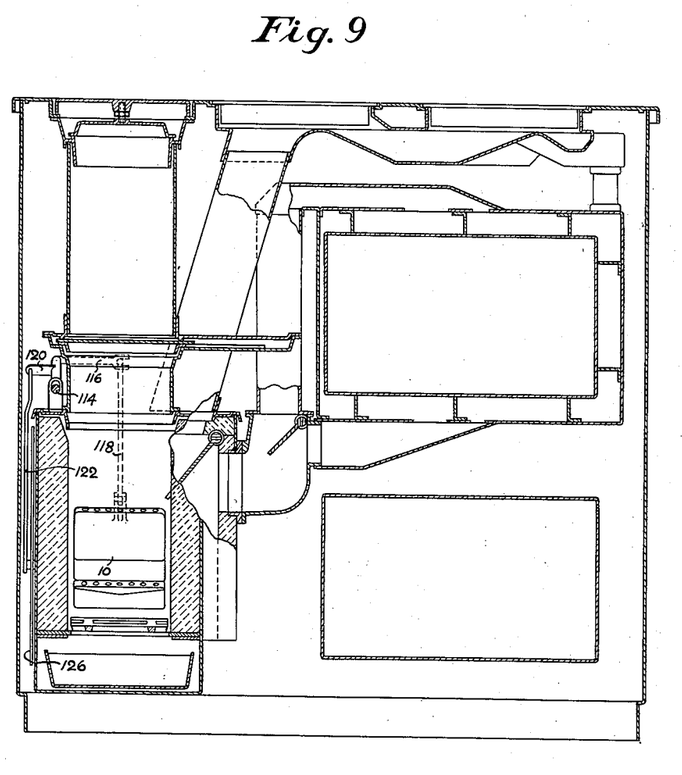

The modified embodiment according to Figs. 8 and 9 differs from that above described substantially as far as the construction of the damper and the grate is concerned. According to this embodiment the damper has no slot but its lower edge serves to determine the size of the outlet opening. The lower edge extends along a broken or bent line having its lowest point substantially at the middle whereby the same effect is attained as that of the specially shaped slot 22 in the damper plate 10 of the first embodiment. Provided between the damper and the grate is a frame 108 on which the damper slides. Certain parts of this frame are hollow and form channels which communicate with the atmosphere and open into the combustion chamber at the openings 110 and 112. Thus, secondary air of combustion is supplied through these openings, said air also serving to cool the frame 108. The damper plate 10 is adjusted by turning the handle secured to the shaft 114. For this purpose said shaft 114 carries an arm 116 which co-operates with an approximately vertically guided rod 118 to which the damper plate is secured. Further, the shaft 114 carries another arm 120 which by the link 122 operates the covering plate 126 for the air intake in the side of the ash space, said plate being pivoted as at 124.

Also the construction of the grate differs from that of the embodiment first described. The upper part 128 is formed by grate bars evenly distributed over the whole grate surface, whereas the lower part 130 is wholly open at the front and has grate bars only at the rear half of its surface, said lower part 130 forming simultaneously a rigid bottom of the combustion chamber. In normal position the grate bars of the lower part are situated right below the interspaces between the grate bars of the upper part 128 so as to render the grate impermeable or at least difficultly permeable to air in the portion thereof close by the outlet of the combustion gases.

The embodiments above described are to be considered only as examples of the invention which is not limited thereto as to its details.

What I claim is:

1. A furnace of the class described including a combustion chamber, a fuel shaft communicating with the combustion chamber, an adjustable shutting-off member by means of which the fuel shaft at least to its upper portion thereof may be shut off from the combustion chamber to form a separate feeding chamber, a channel opening close by the upper end of said feeding chamber and communicating with a gas outlet, such as a chimney, and a closing member to control the communication between said channel and said feeding chamber, whereby gases from the feeding chamber are sucked out through said channel after said chamber has been shut off from the combustion chamber and the closing member has been opened.

2. A furnace of the class described including a combustion chamber an adjustable damper immediately close by the combustion chamber to form an outlet for combustion gases therefrom variable as to level in the combustion chamber as well as to size, the damper being so constructed that at small total outlet area the outlet is situated substantially at the sides of the damper.

3. A furnace of the class described including a combustion chamber, an adjustable damper immediately close by the combustion chamber to form an outlet for combustion gases therefrom variable as to level in the combustion chamber as well as to size, the damper being so constructed that at small total outlet area the outlet comprises two apertures each situated at a side of the damper.

4. In a furnace for solid fuel, especially wood fired cooking stove, having a grate for supporting the fuel, the provision of a damper plate close by the rear edge of the grate having a slot with its lower margin extending substantially parallel to said rear edge and having its upper margin extending along a broken or bent line having its lowest point substantially at the middle, said damper being adjustable substantially in vertical direction to permit variation of the slot as to size by co-operation of the upper margin thereof with the rear edge of the grate as well as to level in relation to the grate.

5. In a furnace for solid fuel, especially wood fired cooking stove, a grate for supporting the fuel, an air inlet adjacent to and above the grate, and an outlet for combustion gases adjacent to and above the grate opposite to said air inlet, whereby the air and the combustion gases are caused to pass substantially horizontally through the fuel immediately above the grate, said grate at least in the portion of its surface lying nearest to said outlet being normally impermeable substantially to air passing therethrough.

6. In a furnace for solid fuel, especially wood fired cooking stove, a grate structure for supporting the fuel, an air inlet adjacent to and above the grate structure, an outlet for combustion gases adjacent to and above the grate structure opposite said air inlet, whereby the air and the combustion gases are caused to pass substantially horizontally through the fuel immediately above the grate structure, said grate structure comprising a lower grate comprising spaced grate bars and an upper grate comprising spaced grate bars and situated above the lower grate at least the portion thereof lying nearest to the outlet for combustion gases, the grate bars of the one grate normally covering the interspaces between the grate bars of the other grate and the grates being so displaceable in relation to each other as to permit registering of the interspaces of the grates.

7. In a furnace for solid fuel, especially wood fired cooking stove, a grate for supporting the fuel, a door to close the space above the grate, an air inlet in said door for introducing primary combustion air into the furnace, an outlet for combustion gases adjacent to and above the grate opposite said door, whereby the air from the air inlet is guided to pass substantially horizontally through the fuel immediately above the grate, said air inlet comprising apertures located adjacent the sides of the grate and spaced from the center thereof so as to guide a relatively greater quantity of air to the sides of the grate than to the middle thereof, said apertures extending into the furnace in contact with the fuel.

8. In a furnace for solid fuel, especially wood fired cooking stove, a grate for supporting the fuel, a non-adjustable air inlet adjacent to and above the grate, adapted to supply a quantity of air required for low combustion, an adjustable damper opposite said air inlet to control the outflow of combustion gases, whereby the air and combustion gases are caused to pass the fuel substantially horizontally immediately above the grate, an adjustable air inlet separated from said non-adjustable air inlet and adapted to supply a quantity of air required for forced combustion, and means operatively to connect said damper and said adjustable air inlet for common adjustment.

9. In a furnace for solid fuel, especially wood fired cooking stove, a fuel shaft communicating with the combustion chamber, an adjustable shutting-off member by means of which the fuel shaft at least to its upper portion may be shut off from the combustion chamber to form a separate feeding chamber, a channel opening close by the upper end of said feeding chamber and communicating with a gas outlet such as a chimney, and a closure closing the filling opening of the fuel shaft, said closure including a closing member to control the communication between said channel and said feeding chamber, whereby gases from the feeding chamber are sucked out through said channel after said chamber has been shut off from the combustion chamber and the closing member has been opened.

10. In a furnace for solid fuel, especially wood fired cooking stove, a fuel shaft communicating with the combustion chamber, an adjustable shutting-off member by means of which the fuel shaft at least to its upper portion may be shut off from the combustion chamber to form a separate feeding chamber, a swingable closure closing the filling opening of the fuel shaft and having double walls, and a channel communicating with the space between the two walls of said closure and with a gas outlet such as a chimney, the lower wall of said closure controlling the communication between said channel and said feeding chamber, whereby gases from the feeding chamber are sucked out through said channel after said chamber has been shut off from the combustion chamber and the closure has been opened.

11. In a furnace for solid fuel, especially wood fired cooking stove, a fuel shaft communicating with the combustion chamber, an adjustable shutting-off member by means of which the fuel shaft at least to its upper portion may be shut off from the combustion chamber to form a separate feeding chamber, a channel opening close by the upper end of said feeding chamber and communicating with a gas outlet such as a chimney, a swingable closure closing the filling opening of the fuel shaft, said closure including a closing member to control the communication between said channel and the feeding shaft, whereby gases from the feeding chamber are sucked out through said channel after said chamber has been shut off and the closure has been opened, and vertical screens secured to said closure to extend along the sides of the fuel shaft in the closed position of the closure and to form side walls of the feeding opening in the open position of the closure.

12. In a furnace for solid fuel, especially wood fired cooking stove, a fuel shaft communicating with the combustion chamber, an adjustable shutting-off member by means of which the fuel shaft at least to its upper portion may be shut off from the combustion chamber to form a separate feeding chamber, a closed housing on the fuel shaft to receive said shutting-off member in the stowed-away position thereof, a channel opening close by the upper end of said feeding chamber and communicating with a gas outlet such as a chimney, and a closing member to control the communication between said channel and said feeding chamber, whereby gases from the feed chamber are sucked out through said channel after said chamber has been shut off from the combustion chamber and the closing member has been opened.

13. In a furnace for solid fuel, especially wood fired cooking stove, a grate for supporting the fuel, an air inlet adjacent to and above said grate and adapted to supply a quantity of air required for low combustion, a damper close by the rear edge of the grate opposite said air inlet to form an outlet for combustion gases, whereby the air and combustion gases are caused to pass substantially horizontally through the fuel immediately above the grate, said air inlet comprising apertures so distributed as to guide a relatively greater quantity of air to the sides of the grate than to the middle thereof and said damper being adjustable to vary the outlet as to level in relation to the grate as well as to size in such manner that at small total outlet area the outlet is situated substantially at the sides of the damper.

14. In a furnace for solid fuel, especially wood fired cooking stove, a fuel shaft communicating with the combustion chamber, a grate for supporting the fuel forming the bottom of said chamber, an adjustable shutting-off member to shut off the fuel shaft at least to its upper portion from the combustion chamber to form a separate feeding chamber, a closure closing the filling opening of said feeding chamber, means controlled by said closure to connect said feed chamber with a gas outlet when said closure is opened, an air inlet adjacent to and above the grate, and an outlet for combustion gases adjacent to and above the grate opposite said air inlet, whereby the air and the combustion gases are caused to pass through the fuel immediately above the grate.

KARL EINAR LÖFVENMARK.